United States Patent
Liang et al.

(10) Patent No.: US 6,659,206 B2
(45) Date of Patent: Dec. 9, 2003

(54) HARDFACING COMPOSITION FOR ROCK BITS

(75) Inventors: Dah-ben Liang, The Woodlands, TX (US); Alysia C. White, Fulshear, TX (US)

(73) Assignee: Smith International, Inc., Houston, TX (US)

( * ) Notice: Subject to any disclaimer, the term of this patent is extended or adjusted under 35 U.S.C. 154(b) by 80 days.

(21) Appl. No.: 10/039,912

(22) Filed: Oct. 29, 2001

(65) Prior Publication Data

US 2003/0079565 A1 May 1, 2003

(51) Int. Cl.⁷ .............................................. E21B 10/46
(52) U.S. Cl. ........................................ 175/374; 175/425
(58) Field of Search .................................. 175/374, 424, 175/425, 428; 427/557, 558, 564; 81/309

(56) References Cited

U.S. PATENT DOCUMENTS

| | | | |
|---|---|---|---|
| 3,800,891 A | 4/1974 | White et al. ................. | 175/374 |
| 4,836,307 A | 6/1989 | Keshavan et al. ........... | 175/374 |
| 4,944,774 A | 7/1990 | Keshavan et al. ............ | 51/309 |
| 5,492,186 A | 2/1996 | Overstreet et al. .......... | 175/374 |
| 5,663,512 A | 9/1997 | Schader et al. ............... | 75/239 |
| 5,715,899 A | 2/1998 | Liang et al. .................. | 175/374 |
| 5,791,422 A | 8/1998 | Liang et al. .................. | 175/374 |
| 5,921,330 A | 7/1999 | Sue et al. ..................... | 175/374 |
| 5,944,127 A | 8/1999 | Liang et al. .................. | 175/374 |
| 6,124,564 A | 9/2000 | Sue et al. .............. | 219/121.47 |
| RE37,127 E | 4/2001 | Schader et al. ............... | 75/239 |
| 6,248,149 B1 | 6/2001 | Massey et al. ................ | 75/236 |
| 6,360,832 B1 * | 3/2002 | Overstreet et al. .......... | 175/374 |

\* cited by examiner

Primary Examiner—William Neuder
(74) Attorney, Agent, or Firm—Rosenthal & Osha L.L.P.

(57) ABSTRACT

A hardfacing composition for a drill bit is disclosed which includes a carbide phase made from about 80% to less than 100% by weight of a combination of sintered carbide pellets and crushed cast carbide and from more than 0% to about 20% by weight of carburized tungsten carbide. The composition includes a binder alloy. A roller cone drill bit includes a bit body and at least one roller cone rotatably mounted to the bit body. The at least one roller cone includes at least one cutting element. The cutting element has on its exterior surface a hardfacing. The hardfacing on the cutting element was formed with a hardfacing composition that includes a binder alloy and a carbide phase, which includes from about 80% to less than 100% by weight of a combination of sintered carbide pellets and crushed cast carbide, and from more than 0% to about 20% by weight of carburized tungsten carbide.

54 Claims, 1 Drawing Sheet

HARDFACING COMPOSITION FOR ROCK BITS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of hardfacing materials used to improve the wear resistance of metals. More particularly, the invention relates to compositions of hardfacing materials which are particularly suitable for use on drill bits.

2. Background Art

Bits for drilling oil wells ("rock bits") typically have steel bodies ("bit bodies") that are connected at the bottom of drill strings. One or more roller cones are rotatably mounted to the bit body. These roller cones have a plurality of teeth attached thereto. These teeth crush, gouge, and scrape rock at the bottom of a hole being drilled. Several types of roller cone drill bits are available for drilling wellbores through earth formations, including insert bits (e.g. tungsten carbide insert bit, TCI) and "milled tooth" bits. The following illustration and discussion will use the milled tooth bits as examples. However, it should be noted that the invention is not limited to this type of bits. Instead, the invention is applicable to any rock bit.

Milled tooth bits include one or more roller cones rotatably mounted to a bit body. The one or more roller cones are typically made from steel and include a plurality of teeth formed integrally with the material from which the roller cones are made. Typically, a hardfacing material is applied, such as by arc or gas welding, to the exterior surface of the teeth to improve the wear resistance of the teeth. The hardfacing material typically includes one or more metal carbides, which are bonded to the steel teeth by a metal alloy ("binder alloy"). In effect, the carbide particles are suspended in a matrix of metal forming a layer on the surface. The carbide particles give the hardfacing material hardness and wear resistance, while the matrix metal provides fracture toughness to the hardfacing.

Many factors affect the durability of a hardfacing composition in a particular application. These factors include the chemical composition and physical structure (size and shape) of the carbides, the chemical composition and microstructure of the matrix metal or alloy, and the relative proportions of the carbide materials to one another and to the matrix metal or alloy.

The metal carbide most commonly used in hardfacing is tungsten carbide. Small amounts of tantalum carbide and titanium carbide may also be present in such material, although these other carbides are considered to be deleterious. It is quite common to refer to the material in the hardfacing merely as "carbide" without characterizing it as tungsten carbide. It should be understood that as used herein, "carbide" generally means tungsten carbide.

Many different types of tungsten carbides are known based on their different chemical compositions and physical structure. Three types of tungsten carbide commonly employed in hardfacing drill bits are: cast tungsten carbide, macro-crystalline tungsten carbide, and cemented tungsten carbide (also known as sintered tungsten carbide). The most common among these is possibly crushed cast carbide.

Tungsten forms two carbides, monotungsten carbide (WC) and ditungsten carbide ($W_2C$). Tungsten carbide may also exist as a mixture of these two forms with any proportion between the two. Cast carbide is a eutectic mixture of the WC and $W_2C$ compounds, and as such the carbon content in cast carbide is sub-stoichiometric, i.e., it has less carbon than the more desirable WC form of tungsten carbide. Cast carbide is prepared by freezing carbide from a molten state and crushing and comminuting the resultant particles to the desired particle size.

Macro-crystalline tungsten carbide is essentially stoichiometric WC in the form of single crystals. While most of the macro-crystalline tungsten carbide is in the form of single crystals, some bicrystals of WC are found in larger particles. Macro-crystalline WC is a desirable hardfacing material because of its toughness and stability.

The third type of tungsten carbide used in hardfacing is cemented tungsten carbide, also known as sintered tungsten carbide. Cemented tungsten carbide comprises small particles of tungsten carbide (e.g., 1 to 15 microns) bonded together with cobalt. Cemented tungsten carbide is made by mixing organic wax, tungsten carbide and cobalt powders, pressing the mixed powders to form a green compact, and "sintering" the composite at temperatures near the melting point of cobalt. The resulting dense cemented carbide can then be crushed and comminuted to form particles of cemented tungsten carbide for use in hardfacing.

In addition to these three types of commonly used carbides, carburized tungsten carbide may also be used to provide desired property. Other compositions for hardfacing are disclosed, for example in U.S. Pat. No. 4,836,307 issued to Keshavan et al., and U.S. Pat. No. RE 37,127 issued to Schader et al.

As mentioned above, conventional hardfacing usually comprises particles of tungsten carbide bonded to the steel teeth by a metal alloy. In effect, the carbide particles are suspended in a matrix of metal forming a layer on the surface. Most hardfacing on rock bits employs steel as the matrix, although other alloys may also be used. Such steel or other alloys will be generally referred to as a binder alloy. Hardfacing compositions are typically applied from tube rods, for example as disclosed in U.S. Pat. No. 5,250,355 issued to Newman et al.

A typical technique for applying hardfacing to the teeth on a rock bit is by oxyacetylene or atomic hydrogen welding. A welding "rod" or stick is typically formed of a tube of mild steel sheet enclosing a filler which mainly comprises carbide particles. The filler may also include deoxidizer for the steel, flux and a resin binder. The hardfacing is applied by melting an end of the rod on the face of the tooth. The steel tube melts to weld to the steel tooth and provide the matrix for the carbide particles. The deoxidizer alloys with the mild steel of the tube.

Although mild steel sheet is used when forming the tubes, the steel in the hardfacing on a finished a rock bit is a hard, wear resistant alloy steel. The conversion from a mild steel to the hard, wear resistant alloy steel occurs when the deoxidizers (which contain silicon and manganese) in the filler and tungsten, carbon, and possibly cobalt, from the tungsten carbide dissolve and mix with the steel during welding. There may also be some mixing with alloy steel from the teeth on the cone.

Advances in wear resistance of hardfacing are desirable to enhance the footage a drill bit can drill before becoming dull, and to enhance the rate of penetration of such drill bits. Such improvements translate directly into reduction of drilling expense. The composition of a hardfacing material, and the physical structure of the hardfacing material applied to the surfaces of a drill bit are related to the degree of wear resistance and toughness. It is desirable to have a composition of hardfacing material, which when applied to wear surfaces, provides improved wear resistance and toughness.

SUMMARY OF INVENTION

One aspect of the invention relates to a hardfacing composition for a drill bit, which includes a carbide phase comprising from about 80% to less than 100% by weight of a combination of sintered carbide pellets and crushed cast carbide and from more than 0% to about 20% by weight of carburized tungsten carbide. The composition includes a binder alloy.

Another aspect of the invention relates to a hardfacing composition for a drill bit, which includes a carbide phase comprising from about 80% to less than 100% by weight of a combination of sintered carbide pellets and crushed cast carbide and from more than 0% to about 20% by weight of carburized tungsten carbide. The sintered carbide pellets in this composition includes more than one population of pellets having different size ranges. The composition includes a binder alloy.

Another aspect of the invention relates to a hardfacing composition for a drill bit, which includes a carbide phase comprising from about 80% to about 95% by weight of a combination of sintered carbide pellets and crushed cast carbide and from about 5% to about 20% by weight of macro-crystalline tungsten carbide. Such compositions include a binder alloy.

Yet another aspect of the invention relates to roller cone drill bits. According to one embodiment of the invention, a roller cone drill bit includes a bit body and at least one roller cone rotatably mounted to the bit body. The at least one roller cone includes at least one cutting element. The cutting element has on its exterior surface a hardfacing. The hardfacing on the cutting element was formed with a hardfacing composition that includes a binder alloy and a carbide phase, which includes from about 80% to less than 100% by weight of a combination of sintered carbide pellets and crushed cast carbide, and from more than 0% to about 20% by weight of carburized tungsten carbide.

Other aspects and advantages of the invention will be apparent from the following description and the appended claims.

DETAILED DESCRIPTION

Figure 1:
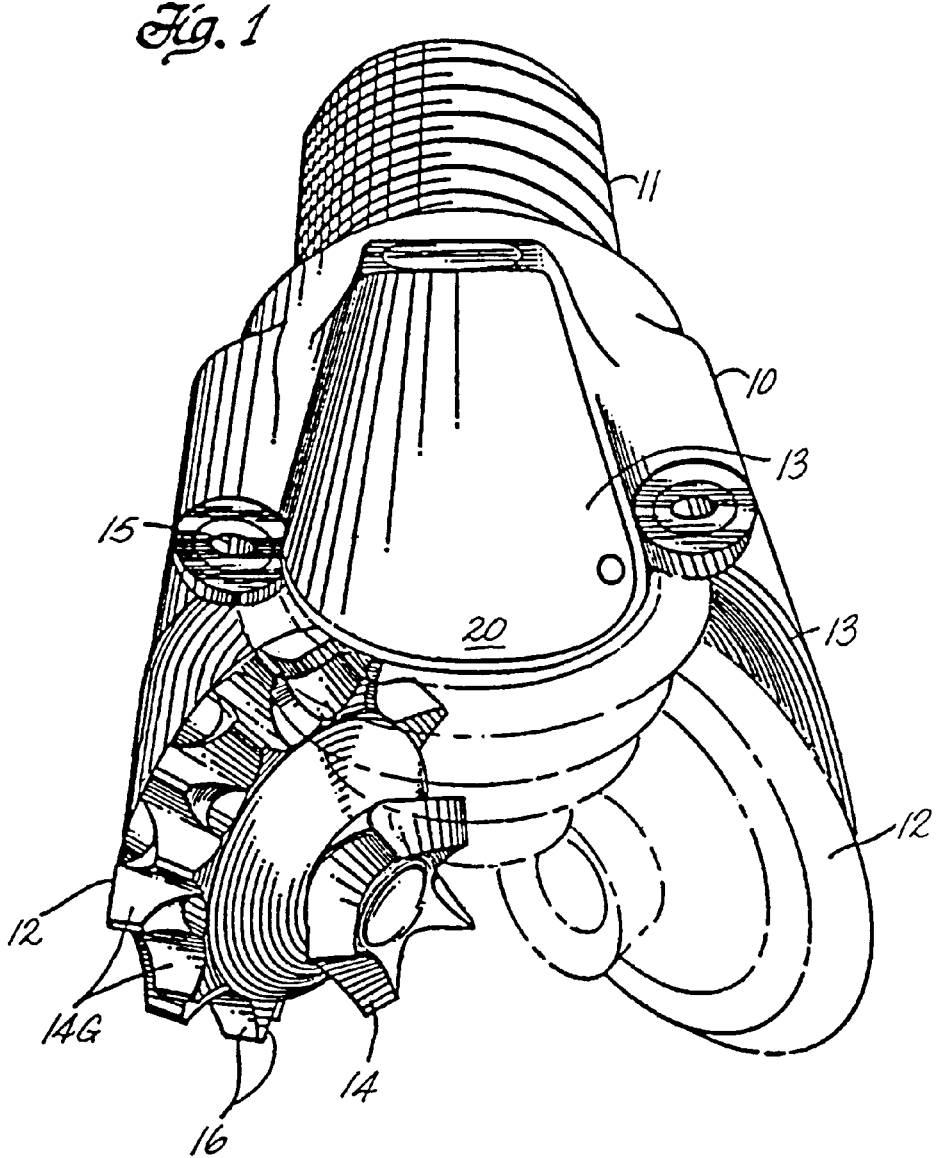
FIG. 1 shows an example of a milled tooth roller cone rock bit.

An example of a milled tooth roller cone drill bit includes a steel body 10 having a threaded coupling ("pin") 11 at one end for connection to a conventional drill string (not shown). At the opposite end of the drill bit body 10 there are three roller cones 12, for drilling earth formations to form an oil well or the like ("wellbore"). Each of the roller cones 12 is rotatably mounted on a journal pin (not shown in FIG. 1) extending diagonally inwardly on each one of the three legs 13 extending downwardly from the bit body 10. As the bit is rotated by the drill string (not shown) to which it is attached, the roller cones 12 effectively roll on the bottom of the wellbore being drilled. The roller cones 12 are shaped and mounted so that as they roll, teeth 14 on the cones 12 gouge, chip, crush, abrade, and/or erode the earth formations (not shown) at the bottom of the wellbore. The teeth 14G in the row around the heel of the cone 12 are referred to as the "gage row" teeth. They engage the bottom of the hole being drilled near its perimeter or "gage." Fluid nozzles 15 direct drilling fluid ("mud") into the hole to carry away the particles of formation created by the drilling.

Such a roller cone rock bit as shown in FIG. 1 is conventional and is therefore merely one example of various arrangements that may be used in a rock bit which is made according to the invention. For example, most roller cone rock bits have three roller cones as illustrated in FIG. 1. However, one, two and four roller cone drill bits are also known in the art. Therefore, the number of such roller cones on a drill bit is not intended to be a limitation on the scope of the invention. The arrangement of the teeth 14 on the cones 12 shown in FIG. 1 is just one of many possible variations. In fact, it is typical that the teeth on the three cones on a rock bit differ from each other so that different portions of the bottom of the hole are engaged by each of the three roller cones so that collectively the entire bottom of the hole is drilled. A broad variety of tooth and cone geometries are known and do not form a specific part of this invention, nor should the invention be limited in scope by any such arrangement.

Figure 2:
FIG. 2 shows a cross-section of an example of a milled tooth.

The example teeth on the roller cones shown in FIG. 1 are generally triangular in a cross-section taken in a radial plane of the cone. Referring to FIG. 2, such a tooth 14 has a leading flank 16 and a trailing flank 17 meeting in an elongated crest 18. The flank of the tooth 14 is covered with a hardfacing layer 19. Sometimes only the leading face of each such tooth 14 is covered with a hardfacing layer so that differential erosion between the wear-resistant hardfacing on the front flank of a tooth and the less wear-resistant steel on the trailing face of the tooth tends to keep the crest of the tooth relatively sharp for enhanced penetration of the rock being drilled.

The leading flank 16 of the tooth 14 is the face that tends to bear against the undrilled rock as the rock bit is rotated in the wellbore. Because of the various cone angles of different teeth on a roller cone relative to the angle of the journal pin on which each cone is mounted, the leading flank on the teeth in one row on the same cone may face in the direction of rotation of the bit, whereas the leading flank on teeth in another row may on the same cone face away from the direction of rotation of the fit. In other cases, particularly near the axis of the bit, neither flank can be uniformly regarded as the leading flank and both flanks may be provided with a hardfacing. There are also times when the ends of a tooth, that is, the portions facing in more or less an axial direction on the cone, are also provided with a layer of hardfacing. This is particularly true on the so-called gage surface of the bit which is often provided with a hardfacing. The gage surface is a generally conical surface at the heel of a cone which engages the side wall of a hole as the bit is used. The gage surface includes the outer end of teeth in the so-called gage row of teeth nearest the heel of the cone and may include additional area nearer the axis of the cone than the root between the teeth. The gage surface is not considered to include the leading and trailing flanks of the gage row teeth. The gage surface encounters the side wall of the hole in a complex scraping motion which induces wear of the gage surface. In some drill bits, hardfacing may also be applied on the shirttail (20 in FIG. 1) at the bottom of each leg on the bit body.

Such structures for a milled tooth rock bit are well known in the art and do not form a specific portion of this invention.

Embodiments of the invention relate to the compositions of hardfacing materials for application to rock bits, including milled tooth cutter cones. The hardfacing materials according to the invention comprise sintered carbide pellets, crushed cast carbide particles, and carburized tungsten carbide. These carbides are applied in some embodiments as a filler in a steel tube. The hardfacing materials may further comprise deoxidizer and resin. When these materials are applied to drill bits, the carbide particles are in a matrix of alloy steel welded to the drill bits.

The hardfacing layer may be applied to the teeth and/or shirttail using processes well known in the art. One such process is atomic hydrogen welding. Another process is oxyacetylene welding. Other processes include plasma transferred arc ("PTA"), gas tungsten arc, shield metal arc processes and other thermal deposition processes. In oxy-acetylene welding, for example, the hardfacing material is typically supplied in the form of a tube or hollow rod ("a welding tube"), which is filled with granular material of selected composition. The tube is usually made of steel (iron) or similar metal (e.g., nickel and cobalt) which can act as a binder when the rod and its granular contents are heated. The tube thickness is selected so that its metal forms a selected fraction of the total composition of the hardfacing material as applied to the drill bit. The granular filler of the rod or tube typically includes various forms of metal carbides (e.g., tungsten, molybdenum, tantalum, niobium, chromium, and vanadium carbides), and most typically, various forms of tungsten carbide. Alternatively, the binder alloy may be in the form of a wire ("a welding wire") and the hardfacing materials are coated on the wire using resin binders. With a PTA welding process, the hardfacing materials may be supplied in the form of a welding tube, a welding wire, or powder, although the powder form is preferred.

As discussed earlier, cast tungsten carbide is an eutectic mixture of bitungsten carbide, $W_2C$, and monotungsten carbide, WC. The cast carbide is typically made by resistance heating tungsten in contact with carbon in a graphite crucible having a hole through which the resultant eutectic mixture drips. The liquid is quenched in a bath of oil and is subsequently crushed and comminuted to a desired particle size. The crushed eutectic is what is known as cast carbide.

Cemented tungsten carbide (also known as sintered tungsten carbide) refers to a material formed by mixing particles of tungsten carbide, typically monotungsten carbide, and particles of cobalt or other iron group metal, and sintering the mixture. In a typical process for making cemented tungsten carbide, small tungsten carbide particles, e.g., 1–15 microns, and cobalt particles are vigorously mixed with a small amount of organic wax which serves as a temporary binder. An organic solvent may be used to promote uniform mixing. The mixture may be prepared for sintering by either of two techniques: it may be pressed into solid bodies often referred to as green compacts; alternatively, it may be formed into granules or pellets such as by pressing through a screen, or tumbling and then screened to obtain more or less uniform pellet size.

Such green compacts or pellets are then heated in a vacuum furnace to first evaporate the wax and then to a temperature near the melting point of cobalt (or the like) to cause the tungsten carbide particles to be bonded together by the metallic phase. After sintering, the compacts are crushed and screened for the desired particle size. Similarly, the sintered pellets, which tend to bond together during sintering, are crushed to break them apart. These are also screened to obtain a desired particle size. The crushed cemented carbide is generally more angular than the pellets which tend to be rounded.

Another type of tungsten carbide is macro-crystalline carbide. This material is essentially stoichiometric WC. Most of the macro-crystalline tungsten carbide is in the form of single crystals, but some bicrystals of WC may also form in larger particles. Single crystal monotungsten carbide is commercially available from Kennametal, Inc., Fallon, Nev.

Carburized carbide is yet another type of tungsten carbide. Carburized tungsten carbide is a product of the solid-state diffusion of carbon into tungsten metal at high temperatures in a protective atmosphere. Sometimes it is referred to as fully carburized tungsten carbide. Such carburized tungsten carbide grains usually are multi-crystalline, i.e., they are composed of WC agglomerates. The agglomerates form grains that are larger than the individual WC crystals. These large grains make it possible for a metal infiltrant or a infiltration binder to infiltrate a powder of such large grains. On the other hand, fine grain powders, e.g., grains less than 5 $\mu$m, do not infiltrate satisfactorily. Typical carburized tungsten carbide contains a minimum of 99.8% by weight of WC, with a total carbon content in the range of about 6.08% to about 6.18% by weight.

The above-described are examples of how various tungsten carbides may be formed. However, it is to be understood that methods other than that specifically described may be used without departing from the scope of the invention.

Both cemented carbide and cast carbide may be formed into crushed particles or pellets. The shape and size of the carbide particles affect the packing of these particles in the matrix, hence wear resistance and toughness of a hardfacing.

Carbide particles are often measured in a range of mesh sizes, for example 40 to 80 mesh. The term "mesh" actual refers to the size of the wire mesh used to screen the carbide particles. For example, "40 mesh" indicates a wire mesh screen with forty holes per linear inch, where the holes are defined by the crisscrossing strands of wire in the mesh. The hole size is determined by the number of meshes per inch and the wire size. The mesh sizes referred to herein are standard U.S. mesh sizes. A standard 40 mesh screen has holes such that only particles having a dimension less than 420 $\mu$m can pass. That is, particles larger than 420 $\mu$m in size will be retained on a 40 mesh screen, while particles smaller than 420 $\mu$m will pass through the screen. Therefore, the range of sizes of the carbide particles in a filler is defined by the largest and smallest grade of mesh used to screen the particles. An exemplary filler comprising carbide particles in the range of from 16 to 40 mesh will only contain particles larger than 420 $\mu$m and smaller than 1190 $\mu$m, whereas another filler comprising particles in the range of from 40 to 80 mesh will only contain particles larger than 180 $\mu$m and smaller than 420 $\mu$m. Hence, there is no overlap in terms of particle size between these two ranges.

In addition to the carbide in the filler in the tube, it is desirable to include up to five percent by weight of deoxidizer and a temporary resin binder. A suitable deoxidizer is silicomanganese obtained from Chemalloy in Pennsylvania. A typical composition of the silicomanganese is 65% to 68% manganese, 15% to 18% silicon, a maximum of 2% carbon, a maximum of 0.05% sulfur, a maximum of 0.35% phosphorus, and a balance of iron. Preferably about four percent deoxidizer is used. A small amount of thermoset resin is desirable for partially holding the particles together in the tube so that they do not simply fall out during welding. A half percent by weight of resin is adequate. The term "deoxidizer" as used herein refers generally to deoxidizer with or without the resin.

The proportion of filler ("carbide phase") to the steel tube ("binder alloy") in embodiments of the invention is about 50% to about 80% by weight filler and about 20% to about 50% by weight steel tube (or binder alloy). A preferred proportion is about 65% to about 70% by weight filler, and most preferably about 68% by weight filler. All percentages given are pre-application ratios. The proportions can be controlled by using steel tubes of different thickness and diameters. For example. to obtain a 70:30 weight ratio of filler to steel, a 5/32 inch (4 mm) diameter tube is made with steel having a wall thickness of 0.017 inch (0.43 mm). Alternatively, a 3/16 inch (4.5 mm) diameter steel tube with a wall 0.02 inch (0.5 mm) thick will produce roughly the same weight ratio.

According to embodiments of the present invention, compositions of the hardfacing materials include tungsten carbides in the following forms. Sintered carbide, in the form of pellets and preferably having a size in the range of about 16–40 ASTM mesh, crushed cast carbide, preferably having a particle size in a range of about 40–80 ASTM mesh, and carburized tungsten carbide, preferably having a particle size in arrange of about 10–50 micrometers ($\mu$m). In some embodiments, the sintered carbide pellets and the crushed cast carbide particles together form about 80% to less than 100% by weight of the carbide phase in the hardfacing composition, while the carburized tungsten carbide comprises from more than 0% to about 20%, preferably from about 5% to about 15%, by weight of the carbide phase.

In some embodiments of the invention, the sintered carbide pellets may comprise more than one population of particle sizes. For example, one group of the pellets may have a size in the range of about 16–20 ASTM mesh and the other group of the pellets may have a size in the range of about 30–40 ASTM mesh. Similarly, other combinations of populations with different sizes are possible. Having two or more populations of different sizes affords flexibility in the control of particle size distribution, hence better control/fine tuning of the desired properties. For example, in one embodiment, one group of sintered carbide pellets has a size range of about 16 to 20 mesh and the other group of sintered carbide pellets has a size range of about 30 to 40 mesh. Appropriate proportions of these two groups may be employed to form a composition with a desired property. For example, the proportion may be adjusted such that one will have more coarse pellets (16–20 mesh) than fine pellets (30–40 mesh), or vice versa. The total amount of these two groups of sintered carbide pellets comprises from about 50% to about 80%, preferably about 65% to about 70% and most preferably about 68%, by weight of the carbide phase. Such embodiment may also comprise from about 15% to about 20%, preferably about 18%, by weight of crushed cast carbide in a size range of about 40 to 80 mesh, and more than 0% but less than about 20%, preferably about 5% to about 15% and most preferably about 10%, by weight of carburized tungsten carbide in a size range of about 10–50 $\mu$m. The deoxidizer/resin makes up about 4% by weight of this example composition as filler in a tube or rod. The filler makes up from about 50% to about 80%, preferably from about 65% to about 70%, by weight of the total composition, the remainder being steel used to form the tube or rod.

Some embodiments of the invention may include sintered carbide, in the form of pellets and preferably having a size in the range of about 16–40 ASTM mesh, crushed cast carbide, preferably having a particle size in a range of about 40–80 ASTM mesh, and macro-crystalline tungsten carbide, preferably having a particle size in a range of under about 80 ASTM mesh, preferably about 100–625 ASTM mesh. In these embodiments, the sintered carbide pellets and the crushed cast carbide particles together form about 80% to about 95% by weight of the carbide phase, while macro-crystalline tungsten carbide form about 5% to about 20% by weight of the carbide phase.

In the embodiments of the invention, the carbide phase of the hardfacing composition makes up from about 50% to about 80%, preferably from about 65% to about 70%, by weight of the total hardfacing composition. The remainder of the composition includes binder alloy, which as explained can be the metal in the welding tube or rod, or in the form of powder if welding such as PTA is used, and may include a deoxidizer/resin of types well known in the art. Typically, the deoxidizer/resin will form no more than about 5%, preferably about 4%, by weight of the total hardfacing composition.

Embodiments of the invention are found to have better wear resistance and better toughness. While the precise mechanism for the improved properties is not known, it is possible that the coarser sintered carbide pellets contribute to the increased wear resistance. It is well known that during welding (application) some melting might occur on the surface of the carbide particles. Coarser particles may provide more intact core after surface melting. Furthermore, the distribution of the particle sizes of the embodiments of the invention might contribute to better packing density, which will increase wear resistance. Similarly, better packing density allows higher carbide content (and lower binder alloy content) in the hardfacing composition.

In addition, the presence of fine particle carburized tungsten carbide (10–50 $\mu$m) or macro-crystalline tungsten carbide may strengthen the metal matrix by uniformly dispersing the fine carbide particles in the steel matrix without sacrificing toughness. U.S. Pat. No. 5,791,422 issued to Liang et al. hypothesizes that the mechanism for this strengthening is dispersion strengthening of the steel matrix. As a result of the dispersion strengthening, the wear resistance of the steel matrix is increased and the overall chipping resistance is markedly improved. The fine carbide particles to be dispersed in the steel matrix according to embodiments of the present invention may be either macro-crystalline tungsten carbide or carburized tungsten carbide. In these embodiments, the fine particles of the carburized tungsten carbide or macro-crystalline tungsten carbide are included in the carbide phase (filler) and mixed with other carbide particles in the tube rod to be welded. The fine carbide particles may be uniformly distributed in the matrix by overheating the tube rod during welding to induce dispersion of the fine particles by causing them to migrate through the matrix by convection.

The following illustrates the improved properties of embodiments of the invention ("new hardfacing materials") as compared to a similar hardfacing composition ("old hardfacing material") according to U.S. Pat. No. 5,791,422 issued to Liang et al. and U.S. Pat. No. 5,921,330 issued to Sue et al. The new hardfacing materials comprise from about 65% to about 70% carbide phase (filler) and the remainder binder alloy (steel tube), wherein the carbide phase may comprise more than one population of sintered carbide pellets with different sizes (e.g., 16–20 mesh and 30–40 mesh) in a total amount of about 65% to about 70% by weight of the carbide phase. The carbide phase also comprises crushed cast carbide particles (40–80 mesh) in an amount of about 15% to about 20% by weight of the carbide phase, and carburized tungsten carbide (10–50 µm) in an amount of about 5% to about 15% by weight of the carbide phase. The carbide phase may optionally comprise 4% deoxidizer/resin. The old hardfacing material used in the comparison comprises 60% carbide phase and 40% binder alloy (steel tube), wherein the carbide phase comprise 68% sintered carbide pellets (30–40 mesh), 18% spherical cast carbide pellets (100–200 mesh), 10% carburized tungsten carbide (10–50 µm), and 4% deoxidizer/resin. All percentages are by weight and pre-application.

Drill bits hardfaced with either the new or old hardfacing materials were subjected to the low stress test according to the ASTM G65 protocols. This test measures the volume loss, and the lower loss means better wear resistance. The drill bits hardfaced with the new hardfacing materials showed an average of 25% improvement in wear resistance, as compared to the old hardfacing material. Similarly, under the high stress test according to the ASTM B611 protocols, which measure the wear resistance and toughness, the drill bits hardfaced with the new hardfacing materials showed an average of 33% improvement in high stress toughness and wear resistance over those hardfaced with the old hardfacing material.

Similarly, drill bits hardfaced with the new hardfacing materials showed significantly improved properties in field tests. For example, mill tooth drill bits (8¾ inch diameter FDS+ type drill bits from Smith International) hardfaced with the new hardfacing materials have been subjected to field test (engineering requisition protocol, ER #6021, from Smith International, which tests the design, material, and special features of the bits) and compared against median of offset bit runs. Among 16 bits reported from the field, 7 bits were above average, 8 bits were average, and only one bit was below average in overall performance. Similarly, among 16 bits reported for dull condition rating, 13 bits were rated as above average and 3 bits were rated as average. In the ER rating, 10 bits met the rating objective, one did not, and 5 were unknown. These data illustrate the advantages of the invention.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A hardfacing composition for a drill bit, comprising:
 a carbide phase comprising
  from about 80% to less than 100% by weight of a combination of sintered carbide pellets and crushed cast carbide, and
  from more than 0% to about 20% by weight of carburized tungsten carbide; and
 a binder alloy.

2. The hardfacing composition as defined in claim 1, wherein the sintered carbide pellets have a size in a range of about 16 to 40 mesh.

3. The hardfacing composition as defined in claim 2, wherein the sintered carbide pellets form from about 50% to about 80% by weight of the carbide phase.

4. The hardfacing composition as defined in claim 2, wherein the sintered carbide pellets form from about 65% to about 70% by weight of the carbide phase.

5. The hardfacing composition as defined in claim 1, wherein the crushed cast carbide comprises particles having a size in a range of about 40 to 80 mesh.

6. The hardfacing composition as defined in claim 5, wherein the crushed cast carbide forms from about 15% to about 20% by weight of the carbide phase.

7. The hardfacing composition as defined in claim 1, wherein the carburized tungsten carbide comprises particles having a size in a range of about 10 to 50 micrometers.

8. The hardfacing composition as defined in claim 7, wherein the carburized tungsten carbide forms from about 5% to about 15% by weight of the carbide phase.

9. The hardfacing composition as defined in claim 1, further comprising a deoxidizer in an amount of at most about 5% by weight of the hardfacing composition.

10. The hardfacing composition as defined in claim 1, wherein the carbide phase forms from about 50% to about 80% by weight of the hardfacing composition.

11. The hardfacing composition as defined in claim 1, wherein the carbide phase forms from about 65% to about 70% by weight of the hardfacing composition.

12. The hardfacing composition as defined in claim 1, wherein the binder alloy is in a form selected from a welding tube, a welding wire, and powder.

13. The hardfacing composition as defined in claim 1, wherein the sintered carbide pellets comprise more than one population of pellets, each population having a different size range.

14. The hardfacing composition as defined in claim 13, wherein the sintered carbide pellets form from about 50% to about 80% by weight of the carbide phase.

15. The hardfacing composition as defined in claim 13, wherein the sintered carbide pellets form from about 65% to about 70% by weight of the carbide phase.

16. The hardfacing composition as defined in claim 13, wherein the crushed cast carbide has a size range of about 40 to 80 mesh.

17. The hardfacing composition as defined in claim 16, wherein the crushed cast carbide forms from about 15% to about 20% by weight of the carbide phase.

18. The hardfacing composition as defined in claim 13, wherein the carburized tungsten carbide has a size range of about 10 to 50 micrometers.

19. The hardfacing composition as defined in claim 18, wherein the carburized tungsten carbide forms from about 5% to about 15% percent by weight of the carbide phase.

20. A hardfacing composition for a drill bit, comprising:
 a carbide phase comprising
  from about 80% to about 95% by weight of a combination of sintered carbide pellets and crushed cast carbide, and
  from about 5% to about 20% by weight of macro-crystalline tungsten carbide; and
 a binder alloy.

21. The hardfacing composition as defined in claim 20, wherein the sintered carbide pellets have a size in a range of about 16 to 40 mesh.

22. The hardfacing composition as defined in claim 20, wherein the crushed cast carbide comprises particles having a size in a range of about 40 to 80 mesh.

23. The hardfacing composition as defined in claim 20, wherein the macro-crystalline tungsten carbide comprises particles having a size smaller than about 80 mesh.

24. The hardfacing composition as defined in claim 20, wherein the macro-crystalline tungsten carbide comprises particles having a size in a range of about 100 to 625 mesh.

25. The hardfacing composition as defined in claim 20, wherein the carbide phase forms from about 50% to about 80% by weight of the hardfacing composition.

26. The hardfacing composition as defined in claim 20, wherein the carbide phase forms from about 65% to about 70% by weight of the hardfacing composition.

27. The hardfacing composition as defined in claim 20, further comprising a deoxidizer in an amount of at most about 5% by weight of the hardfacing composition.

28. A roller cone drill bit, comprising:
a bit body; and
at least one roller cone rotatably mounted to the bit body, the at least one roller cone comprising at least one cutting element, the at least one cutting element having on an exterior surface thereof a hardfacing, the hardfacing being formed with a hardfacing composition comprising
a carbide phase comprising
from about 80% to less than 100% by weight of a combination of sintered carbide pellets and crushed cast carbide, and
from more than 0% to about 20% by weight of carburized tungsten carbide; and
a binder alloy.

29. The drill bit as defined in claim 28, wherein the sintered carbide pellets have a size in a range of about 16 to 40 mesh.

30. The drill bit as defined in claim 29, wherein the sintered carbide pellets form from about 50% to about 80% by weight of the carbide phase.

31. The drill bit as defined in claim 29, wherein the sintered carbide pellets form from about 65% to about 70% by weight of the carbide phase.

32. The drill bit as defined in claim 28, wherein the crushed cast carbide comprises particles having a size in a range of about 40 to 80 mesh.

33. The drill bit as defined in claim 32, wherein the crushed cast carbide forms from about 15% to about 20% by weight of the carbide phase.

34. The drill bit as defined in claim 28, wherein the carburized tungsten carbide comprises particles having a size in a range of about 10 to 50 micrometers.

35. The drill bit as defined in claim 34, wherein the carburized tungsten carbide forms from about 5% to about 15% by weight of the carbide phase.

36. The drill bit as defined in claim 28, wherein the hardfacing composition further comprises a deoxidizer in an amount of at most about 5% by weight of the hardfacing composition.

37. The drill bit as defined in claim 28, wherein the carbide phase forms from about 50% to about 80% by weight of the hardfacing composition.

38. The drill bit as defined in claim 28, wherein the carbide phase forms from about 65% to about 70% by weight of the hardfacing composition.

39. The drill bit as defined in claim 28, wherein the sintered carbide pellets comprise more than one population of pellets, each population having a different size range.

40. The drill bit as defined in claim 39, wherein the sintered carbide pellets forms from about 50% to about 80% by weight of the carbide phase.

41. The drill bit as defined in claim 39, wherein the sintered carbide pellets forms from about 65% to about 70% by weight of the carbide phase.

42. The drill bit as defined in claim 39, wherein the crushed cast carbide has a size range of about 40 to 80 mesh.

43. The drill bit as defined in claim 42, wherein the crushed cast carbide forms from about 15% to about 20% by weight of the carbide phase.

44. The drill bit as defined in claim 39, wherein the carburized tungsten carbide has a size range of about 10 to 50 micrometers.

45. The drill bit as defined in claim 44, wherein the carburized tungsten carbide forms from about 5% to about 15% by weight of the carbide phase.

46. A roller cone drill bit, comprising:
a bit body; and
at least one roller cone rotatably mounted to the bit body, the at least one roller cone comprising at least one cutting element, the at least one cutting element having on an exterior surface thereof a hardfacing, the hardfacing being formed with a hardfacing composition comprising
a carbide phase comprising
from about 80% to about 95% by weight of a combination of sintered carbide pellets and crushed cast carbide, and
from about 5% to about 20% by weight of macro-crystalline tungsten carbide; and
a binder alloy.

47. The drill bit as defined in claim 46, wherein the sintered carbide pellets have a size in a range of about 16 to 40 mesh.

48. The drill bit as defined in claim 46, wherein the crushed cast carbide comprises particles having a size in a range of about 40 to 80 mesh.

49. The drill bit as defined in claim 46, wherein the macro-crystalline tungsten carbide comprises particles having a size smaller than about 80 mesh.

50. The drill bit as defined in claim 46, wherein the macro-crystalline tungsten carbide comprises particles having a size in a range of about 100 to 625 mesh.

51. The drill bit as defined in claim 46, wherein the carbide phase forms from about 50% to about 80% by weight of the hardfacing composition.

52. The drill bit as defined in claim 46, wherein the carbide phase forms from about 65% to about 70% by weight of the hardfacing composition.

53. The drill bit as defined in claim 46, wherein the binder alloy is in a form selected from a welding tube, a welding wire, and powder.

54. The drill bit as defined in claim 46, wherein the hardfacing composition further comprises a deoxidizer in an amount of at most about 5% by weight of the hardfacing composition.

* * * * *